May 11, 1971 G. ZIEGLER ET AL 3,578,496

METHOD OF IMPROVING THE SUPERCONDUCTIVITY OF NIOBIUM-TIN LAYERS PRECIPITATED ON A CARRIER

Filed March 28, 1968 2 Sheets-Sheet 1

3,578,496
Patented May 11, 1971

1

3,578,496

METHOD OF IMPROVING THE SUPERCONDUCTIVITY OF NIOBIUM-TIN LAYERS PRECIPITATED ON A CARRIER

Günther Ziegler, Erlangen, and Barbara Wirth, Altenfurt, near Nuremburg, Germany, assignors to Siemens Aktiengesellschaft, Munich and Berlin, Germany Filed Mar. 28, 1968, Ser. No. 716,948
Claims priority, application Germany, Mar. 30, 1967, S 109,081
Int. Cl. C23c *11/02;* H01v *11/00*
U.S. Cl. 117—227 6 Claims

ABSTRACT OF THE DISCLOSURE

Described is a method of improving the superconductive properties of layers of the intermetallic compound niobium-tin ($Nb_3Sn$) which are precipitated on a heated carrier by hydrogen reduction of halides of the elements niobium and tin. The method is characterized in that the coated carrier is subjected to a heat processing, under protective gas, which lowers the hydrogen content of the niobium-tin layer.

Our invention relates to a method for improving the superconductivity of layers comprised of the intermetallic compound niobium-tin ($Nb_3Sn$), precipitated on a heated carrier, by a hydrogen reduction of halides of niobium and tin.

According to known methods, carriers of an appropriate material, for example ceramic or highly heat resistance metal may be coated with a layer of the intermetallic compound niobium-tin ($Nb_3Sn$), by bringing a mixture of gaseous halides of the elements niobium and tin into contact with the heated carrier and reducing the halides by hydrogen at the carrier. See for example, the article by Hanak, Strater and Cullen in "RCA Review" of September 1964, pages 342 to 365. Wires and tapes thus coated are suitable for example, for the winding of supermagnet coils, for producing high magnetic fields. This method can also be used to produce other components with superconducting layers, for example superconducting protective sheets or cylinders to shield or trap magnetic fields.

It is known that the critical temperatures of thus produced niobium-tin layers are frequently below the critical temperatures of 18.2° K., obtained in niobium-tin samples, produced by sintering together niobium and tin powder. The aforementioned lower critical temperatures are due to the deviation of the composition of layers precipitated from gaseous phase, from stoichiometric composition. The critical temperatures are lowered by a reduction in the lattice constant of the niobium-tin layer which occurs with a decrease in the tin content. By "critical temperatures" is meant that temperature at which a transition occurs from the superconducting into the normal conducting electrical state.

More specifically, tests have established that also the critical temperatures of stoichiometrically composed niobium-tin layers produced with the aforementioned method, are frequently far below 18.2° K. The critical current densities, i.e. the densities which cause the transition from a superconducting into a normal conducting electrical state in a given magnetic field, become lower at a decrease in the critical temperature. This worsening of the superconductive properties of the niobium-tin layers proves detrimental in the technical utilization of carriers, which were provided with such layers.

It is an objective of our invention to improve the superconductivity of said layers. To this end and in accordance with our invention, we subject the coated carrier to heat processing, under a protective gas, whereby the hydrogen content of the niobium-tin layer is reduced.

2

Specific tests have surprisingly shown that the niobium-tin layers, while precipitating on the carrier, can interstitially absorb a relatively high amount of hydrogen, i.e. on intermediate lattice places.. The niobium-tin lattice is expanded by the hydrogen, so that the lattice constants of the niobium-tin layers are larger than the lattice constant of the stoichiometric compound $Nb_3Sn$. The expansion of the lattice lowers the critical temperature and reduces the critical current density of the niobium-tin layer.

We remove to a great extent the hydrogen from the niobium-tin layer, thus eliminating the lattice expansion. This results in a considerable rise in the critical temperature and the critical current density of the layer. The heat processing of our invention is conducted under protective gas, to prevent evaporation of tin during the heat processing, and thereby a change in the composition of the niobium-tin layer. The pressure of the protective gas is preferably one atmosphere.

Layers with particularly high critical temperatures may be obtained by selecting the temperature and duration of the heat processing so that the hydrogen content of the niobium-tin layer is reduced to at most 0.5 atom percent (the number of the hydrogen atoms relates to the total number of the atoms of niobium, tin, and hydrogen).

Heat processing is favorably conducted so that following the coating process at a coating temperature of about 900 to 1000° C., the carrier is slowly cooled to a temperature of about 300° C., over a period of at least 1 minute. The temperature drop between about 800° C. and 300° C. is of particular importance for the reduction of the hydrogen content. Apparently no gas exchange takes place any more below 300° C., so that the cooling from 300° C. to room temperature may be carried out quickly.

In a continuously coated wire, tape (band) shaped carrier, the slow cooling process may favorably be carried out in a tempering furnace, arranged behind the coating device. Very favorable results were obtained by conducting the heat-processing in such a way that the cooling period was approximately 1.5 to 2 minutes.

The cooling may be so effected that the temperature of the coated carrier decreases linearly with the time. It is especially preferable, however, that the temperature distribution for the cooling is such that the carrier is maintained at a temperature between about 650 and 550° C. for at least 30 seconds.

The essence of our invention is not that the coated carrier is slowly cooled from the coating temperature to about 300° C. Rather, the heat treatment may be so effected that the coated carrier, which at first is quickly cooled, is heated to a high temperature at a later time point. According to this embodiment of the method, the carrier is preferably heated to a temperature between about 600 and 800° C. for at least 30 seconds, and subsequently cooled, within at least approximately 1 minute, to about 300° C. The heat processing of our invention utilizes the fact that the hydrogen solubility in $Nb_3Sn$ decreases with decreasing temperature. Hence, during a slow cooling process, the hydrogen diffuses from the $Nb_3Sn$ layer.

The invention will be more specifically illustrated by the drawing in which.

Figure 1:
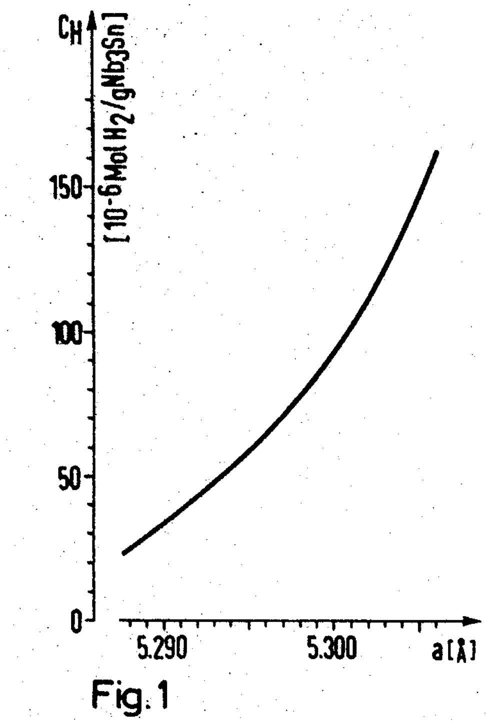
FIG. 1 shows the dependence of the lattice constant of the niobium-tin layer upon the hydrogen concentration.

FIG. 1 shows the relationship between the hydrogen concentration in the niobium-tin layer and the lattice constant of the niobium-tin layer. The ordinate shows the hydrogen concentration in $10^{-6}$ mol $H_2$/gram $Nb_3Sn$, while the abscissa shows the lattice constant in angstroms. The curve indicates average values for the relationship between the two magnitudes, which were established by gas analysis of many niobium-tin layers. In addition to the hydrogen inclusions, negligible oxygen inclusions and additions of foreign elements were also present. These however did not essentially change the course of the curve. As tests have shown, the hydrogen concentration, and thus, the lattice constant were larger, the faster the coated carrier was cooled after the coating process. During the quick cooling process, the hydrogen froze in the layer. For the greatest measured lattice constant of about 5.306 angstroms, a hydrogen concentration of about $170.10^{6}$ mol $H_2$/gram $Nb_3Sn$ had been established. This corresponds to a hydrogen share of about 3.4 atom percent of the total number of atoms of niobium, tin and hydrogen. As FIG. 1 shows, the expansion of the lattice amounts to approximately 1.3 mil per atom percent of hydrogen. The method of the present invention helps to reduce the hydrogen concentration in the niobium-tin layer and thereby reduce the lattice constant of the layer. At a hydrogen concentration of about $25.10^{-6}$ mol $H_2$/gram $Nb_3Sn$, which means about 0.5 atom percent hydrogen, the lattice constant is only about 5.288 angstroms, as the figure shows, and thus approaches (approximates) very closely the lattice constant of hydrogen-free, stoichiometrically composed niobium-tin.

Figure 2:
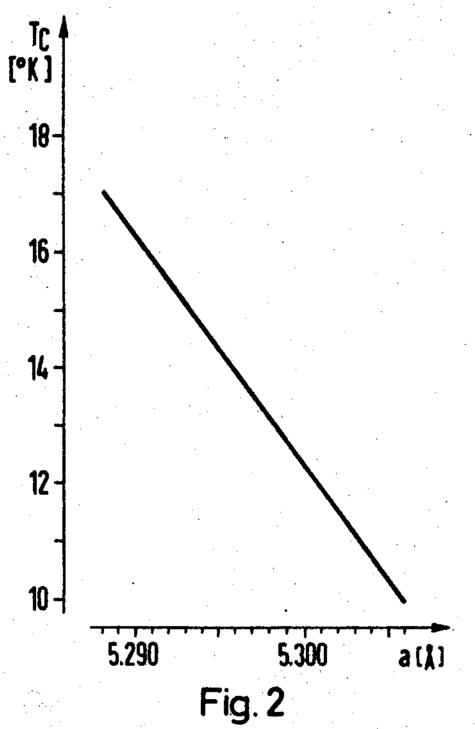
FIG. 2 shows the dependence of the critical temperature of the niobium-tin layer upon the lattice constant.

The curve shown in FIG. 2 illustrates the relationship between the critical temperature of the niobium-tin layer and their lattice constants. This was determined by a plurality of measurements. The ordinate is the critical temperature in Kelvin degrees while the abscissa is the lattice constant in angstrom units. As the curve shows, the critical temperature of stoichiometrically composed niobium-tin layers rises from about 10 to about 17° K. upon a reduction of the lattice constant from 5.306 to 5.288 angstroms.

Figure 3:
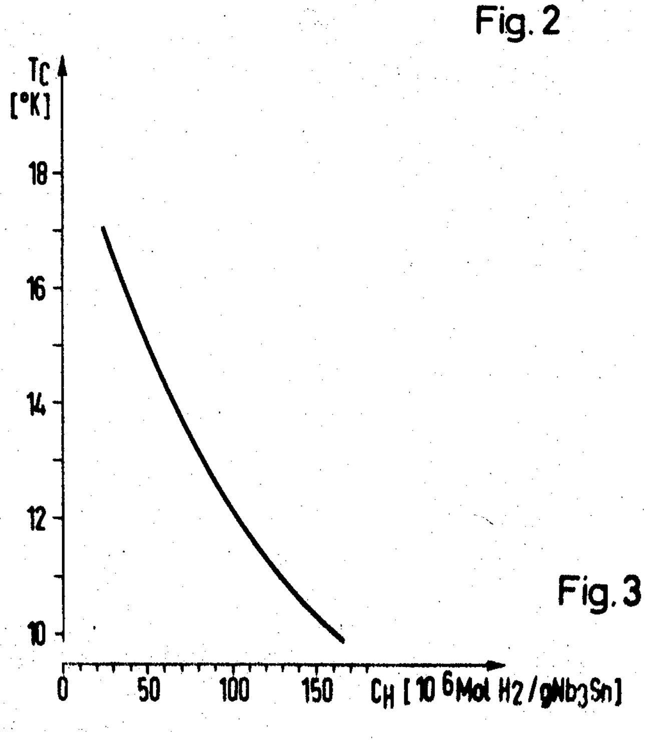
FIG. 3 shows the dependence of the critical temperature of the niobium-tin layer on the hydrogen concentration.

FIG. 3 illustrates the average relationship between hydrogen concentration and critical temperature, derived from FIGS. 1 and 2. Again, the ordinate shows the critical temperature in Kelvin degrees and the abscissa shows the hydrogen concentration in $10^{-6}$ mol $H_2$/gram $Nb_3Sn$. FIG. 3 shows that at a hydrogen concentration of about $170.10^{-6}$ mol $H_2$/gram $Nb_3Sn$, the critical temperature is just about 10° K. By reducing the hydrogen concentration to about $25.10^{-6}$ mol $H_2$/gram $Nb_3Sn$, i.e. to about 0.5 atom percent hydrogen, the critical temperature already rises to 17° K. Still higher critical temperatures may be obtained by a further reduction of the hydrogen content in the niobium-tin layers. The excellent possibilities which the method of the present invention offers for improving the superconductivity of the niobium-tin layers are particularly clearly seen in FIG. 3.

We also discovered that with special constant preparatory conditions, the critical current density of a constant magnet field within a range of 50 to 100 kilooersted, was increased ten times when the hydrogen concentration was reduced from about $100.10^{-6}$ to $25.10^{-6}$ mol $H_2$/gram $Nb_3Sn$.

Figure 4:
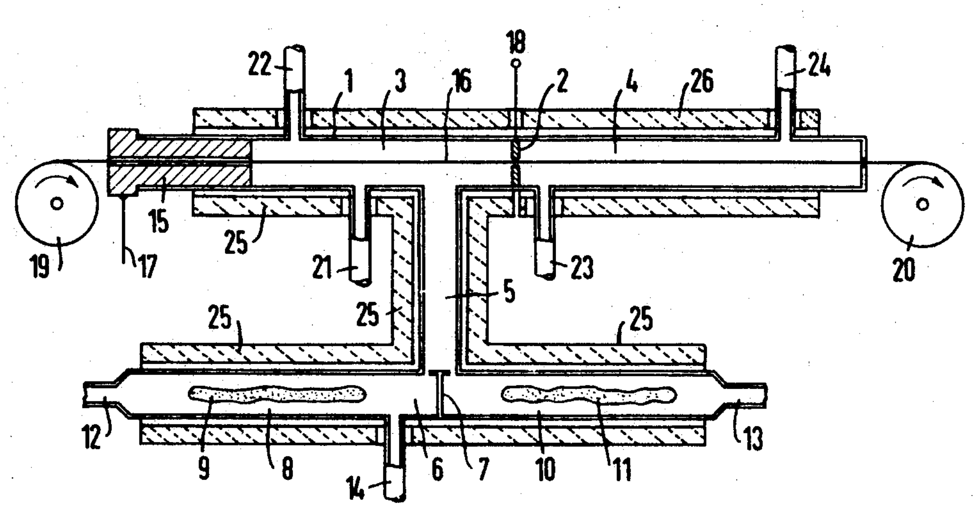
FIG. 4 shows a device for continuous precipitation of the niobium-tin layer on a tape-shaped carrier, with a reheating furnace for executing the method of the present invention.
Figure 5:
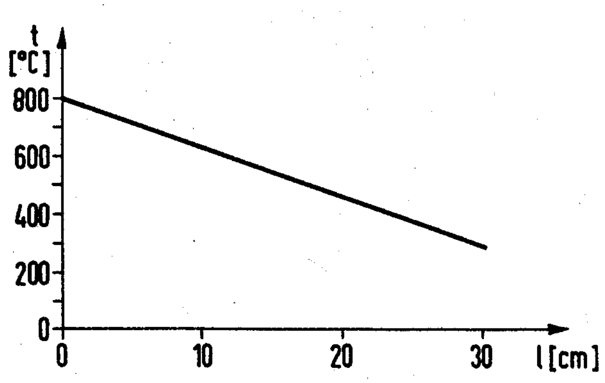
FIG. 5 shows the temperature distribution in a reheating furnace, such as in FIG. 4.
Figure 6:
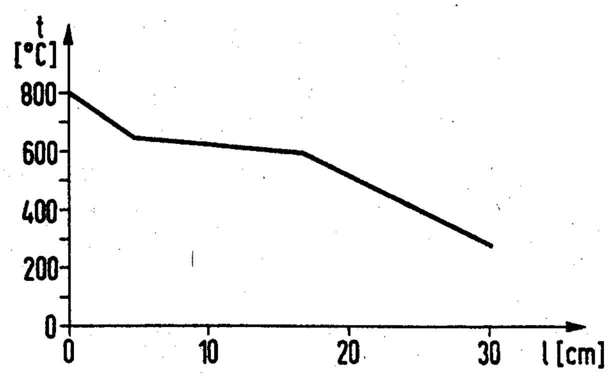
FIG. 6 shows a particularly preferred temperature distribution in a reheating furnace, in a device of FIG. 4.

FIGS. 4 to 6 show an embodiment example of the precipitation of a niobium-tin layer upon a metal band and the heat processing of said layer, in accordance with the method of our invention.

To precipitate the niobium-tin layer, we employ the device of FIG. 4 which comprises a quartz tube 1 which is subdivided by a graphite sealing disc 2 into a coating chamber 3 and a reheating chamber 4. The coating chamber 3 is connected via pipe 5 with another quartz tube 6 which is divided by quartz wall 7. One portion 8 of the tube 6 holds the supply of niobium 9 and during the operation of the device serves as a niobium chlorinator, while the other portion 10 of the pipe 6 holds the supply of tin 11 and during the operation of the device serves as the tin chlorinator. Both ends of the tube 6 are provided with nozzles 12 and 13. Behind the niobium supply 9, another nozzle 14 is installed at portion 8 of the pipe 6. The quartz wall 7 prevents the flow-in of gas from the portion 8 of the pipe 6 in portion 10 and vice versa. One end of quartz tube 1 is sealed with graphite body 15. A graphite disc seals the other end of the coating chamber 3. The graphite body 15 and the graphite disc 2 are provided with an opening as small as possible for passing through the tape-like carrier 16. The carrier 16 is unwound from the roll 19 and is picked up on rewind roll 20 driven by a motor. The carrier 16 maintains a conductive connection with graphite body 15 and disc 2 which are connected to an electric current source, via conductors 17 and 18.

Also, two nozzles 21 and 22 are provided at the coating chamber 3 and two nozzles 23 and 24 are arranged at the reheating chamber 4. The coating chamber 3, as well as the quartz pipes 5 and 6 are surrounded by appropriately formed, for example hinged tubular furnaces 25, which heat the individual portions of the device. The reheating chamber 4 is enclosed by a tubular reheating furnace 26, which is so designed that various temperatures may be set along the longitudinal axis of the chamber 4 and thus along the running direction of the band 16.

For the purpose of coating the tape shaped carrier a niobium supply 9 is inserted into the niobium chlorinator 8 and a tin supply 11 into the tin chlorinator 10. The tape 16, to be coated is installed in an appropriate manner into the quartz tube 1 and pulled through the tube at a constant speed. Preferably, the tape-shaped carrier used is a band of the alloy "Hastelloy Alloy B" (Germ. Ind. Stand. NiMo30), which contains approximately 62% nickel, 26 to 30% molybdenum and the remainder is comprised of small amounts of cobalt, silicon, manganese, iron, carbon and vanadium. Electric current is passed, via leads 17 and 18, through the tape 16 and the current is so measured that the tape or band will be heated to approximately 900 to 1000° C. The tubular furnaces 25 heat the wall of the coating chamber 3 to approximately 730° C., the niobium chlorinator 8 to approximately 900° C., the tin chlorinator 10 to approximately 800° C. and, to prevent a condensation of the chlorides, the pipe 5 to approximately 650° C. After introducing inert gas to force the air from the device, chlorine gas is introduced into the niobium chlorinator 8, via pipe nozzle 12. Chlorine gas enters the tin chlorinator 10, via pipe nozzle 13; passing the chlorine gas across the heated niobium 9, forms gaseous niobium tetrachloride, while gaseous tin chloride $SnCl_2$ develops during the passage of chlorine gas across the molten tin 11. Chlorine gas may also be introduced into the niobium chlorinator 8 behind the niobium supply 9 via the pipe nozzle 14. This chlorine gas serves to effect a partial conversion of the niobium tetrachloride into niobium pentachloride preventing precipitation of solid $NbCl_3$ in coating chamber 3. The gaseous chlorides of niobium and of tin stream through the pipe 5 into the coating chamber 3. At the same time, the coating chamber 3 is supplied, via the pipe nozzle 21, with hydrogen to which hydrogen chloride has been added. The hydrogen reduces the chlorides of niobium and tin at the heated band 41 to coat the latter with an $Nb_3Sn$ layer. The exhaust gases are removed by nozzle 22.

The amounts of gases required during this continuous process, per time unit, depend upon the condition of the chlorination and reduction, i.e. upon the temperatures in the individual parts of the device and the dimensions of said device, and are further to be adjusted to the velocity of the tape-shaped carrier, as well as to the desired thickness of the niobium-tin layer to be produced on the carrier. In the present example, the niobium chlorinator 8 and the tin chlorinator 10 were each about 40 cm. long with the pipe 5 about 20 cm. long. The length of the coating chamber 3 was about 30 cm. The pipes 1, 5 and 6, furthermore, all had the same diameter of about 4 cm. The chlorine flow rate through the niobium chlorinator 8 was about 4 l./h., and the chlorine gas rate of flow through the tin chlorinator 10 was about 8 l./h. The amount of chlorine gas introduced through the pipe nozzle 14, per time unit, was approximately 0.5 l./h., i.e. about 12.5% of the chlorine gas introduced through the pipe nozzle 12. About 10 l./h. hydrogen were consumed to reduce the chlorines. About 2 l./h. hydrogen chloride gas was added to the hydrogen. The tape 16, which was 50$\mu$ thick and 2 mm. wide was pulled through the tube 1, at a velocity of approximately 3 mm./sec. The niobium-tin layer precipitated had a thickness of about 8$\mu$.

Following the coating, the band 16 is led from coating chamber 3 into the reheating chamber 4, for heat processing in accordance with the present invention. Reheating chamber 4 is about 30 cm. long in the present embodiment example. A protective gas, for example argon, helium, nitrogen or even pure hydrogen is passed by means of nozzles 23 and 24 through the reheating chamber 4, so that a protective gas pressure of approximately one atmosphere prevails in the chamber. At a band velocity of 3 mm./sec., the band passes through the reheating chamber 4 in approximately 1.5 minutes.

The temperature curve in the reheating furnace 26, may be set, as shown in FIG. 5, for performing the heat processing. The ordinate of FIG. 5 shows furnace temperature in centigrade degrees, while the abscissa shows the distance in centimeters of the respective furnace portion from graphite disc 2. While passing the furnace, the temperature of the tape-shaped carrier 16 is lowered, as a result of the illustrated temperature distribution, from 800° C. to 300° C., within approximately 1.5 minutes. The hydrogen content in the niobium tin layer is reduced thereby at least to 0.5 atom percent that is it is less than 0.5 atom percent and the critical temperature is increased thereby to approximately 17° K.

The temperature in the reheating furnace 26 does not have to decrease linearly with the distance from the start of the reheating chamber 4, and may rather be effected with particular advantage in the manner shown in FIG. 6. This FIG. 6 like FIG. 5 has as the ordinate, the furnace temperature in degrees centigrade and as the abscissa the distance in centimeters of the respective furnace portion from the beginning of the reheating chamber, i.e. from the disc 2. As shown in the embodiment of FIG. 6, the temperature of the reheating or annealing furnace first drops relatively quickly, from about 800 to 650° C. and is then maintained relatively constant at approximately 600° C. over a longer path (over approximately one third of the furnace length), and only in the last furnace portion is lowered to 300° C. As a result of this temperature distribution, the coated band is maintained for about 30 seconds at a temperature between 650 and 550° C. This temperature distribution proved particularly advantageous for the reduction of the hydrogen content in the niobium tin layer.

In the case of carriers, which are not coated in a continuous process, but remain steadily in the coating chamber, during the coating process, the heat processing method of the present invention may also be so effected that, following the coating process, the coating chamber is slowly cooled, for example in approximately 2 minutes, from a temperature of 800° C. to 300° C. This embodiment is preferred particularly in the production of superconducting components, for example when coating cylinders or sheets.

Subsequent heating of a carrier to about 600 to 800° C., which had been quickly cooled following coating and a subsequent slow cooling will also lead to the desired reduction of the hydrogen content and, thereby, to an improvement of the superconductive qualities of the niobium-tin layer.

In very thick layers, it may be preferable to continue the heat treatment of the present invention for a somewhat longer period, than in the case of thin layers.

We claim:

1. The method of improving the superconductive properties of layers comprised of the intermetallic compound niobium-tin ($Nb_3Sn$) which are precipitated on a heated carrier by hydrogen reduction of halides of the elements niobium and tin by hydrogen which comprises slowly cooling from a coating temperature of about 900 to 1000° C. to a temperature of about 300° C., over a period of at least one minute, the coated carrier in an inert atmosphere, whereby the hydrogen content of the niobium-tin layer is lowered.

2. The method of claim 1, wherein the pressure of the inert atmosphere is approximately one atmosphere.

3. The method of claim 2, wherein the carrier is maintained during the cooling process of at least 30 seconds, at a temperature between approximately 650 and 550° C.

4. The method of claim 2, wherein the slow cooling of a continually coated wire or tape shaped carrier is effected in a reheating or annealing furnace arranged after the coating furnace.

5. The method of claim 4, wherein the cooling period is approximately 1.5 to 2 minutes.

6. The method of improving the superconductive properties of layers of the intermetallic compound niobium-tin ($Nb_3Sn$) which are precipitated on a heated carrier by hydrogen reduction of halides of the elements niobium and tin by hydrogen which comprises rapidly cooling the coated carrier, and thereafter in an inert atmosphere heating the carrier for at least 30 seconds to a temperature between about 600 and 800° C., and subsequently cooling the carrier to about 300° C., over at least one minute thereby reducing the hydrogen content of the niobium-tin layers.

References Cited

UNITED STATES PATENTS

| | | | |
|---|---|---|---|
| 3,443,989 | 5/1969 | Wilhelm | 117—227 |
| 3,346,467 | 10/1967 | Allen | 117—222X |
| 3,243,871 | 4/1966 | Sauer | 29—599 |
| 3,218,693 | 11/1965 | Allen et al. | 29—599 |
| 3,058,851 | 10/1962 | Kahan | 117—227X |

ALFRED L. LEAVITT, Primary Examiner

A. GRIMALDI, Assistant Examiner

U.S. Cl. X.R.

29—599; 117—107.2, 119; 338—22